United States Patent [19]
Lee

[11] Patent Number: 5,276,996
[45] Date of Patent: Jan. 11, 1994

[54] CREEPING PLANT SUPPORTING FRAME ASSEMBLIES

[76] Inventor: Wen-Jin Lee, No. 603, I-Cheng Road Section 1, Pa-Pao Village, Tung-Shan Hsiang, I-Lan Hsieng, Taiwan

[21] Appl. No.: 932,807

[22] Filed: Aug. 20, 1992

[51] Int. Cl.$^5$ ...................... A01G 17/06; A01G 17/14
[52] U.S. Cl. ............................................ 47/47; 47/45
[58] Field of Search ........................................ 47/45 R, 45 C, 47 S, 27

[56] References Cited

U.S. PATENT DOCUMENTS

| 587,581 | 8/1897 | Horan | 47/45 C |
|---|---|---|---|
| 903,986 | 11/1908 | Klahn | 47/45 C |
| 4,914,857 | 4/1990 | Dodgen | 47/45 C |
| 5,048,231 | 9/1991 | Brown | 47/45 C |

FOREIGN PATENT DOCUMENTS

| 274936 | 2/1963 | Australia | 47/45 R |
|---|---|---|---|
| 0386402 | 9/1990 | European Pat. Off. | 47/45 C |
| 34887 | 12/1964 | German Democratic Rep. | 47/45 |
| 133573 | 10/1947 | Hungary | 47/45 R |

Primary Examiner—Ramon S. Britts
Assistant Examiner—Joanne C. Downs
Attorney, Agent, or Firm—Morton J. Rosenberg; David I. Klein

[57] ABSTRACT

A creeping plant supporting frame assembly includes a plurality of upright support frames, which are each comprised of a plurality of elongated upright rods spaced from one another around a circle and connected together by a spiral tie bar around the periphery, anchor rods for supporting the upright support frames on the ground, a meshed head frame supported over the upright support frames for climbing creeping plants, feeder bottles respectively suspended on the upright support frames for watering and feeding liquid fertilizer, and baskets and hangers respectively hung on the upright support frames for carrying fruits.

7 Claims, 5 Drawing Sheets

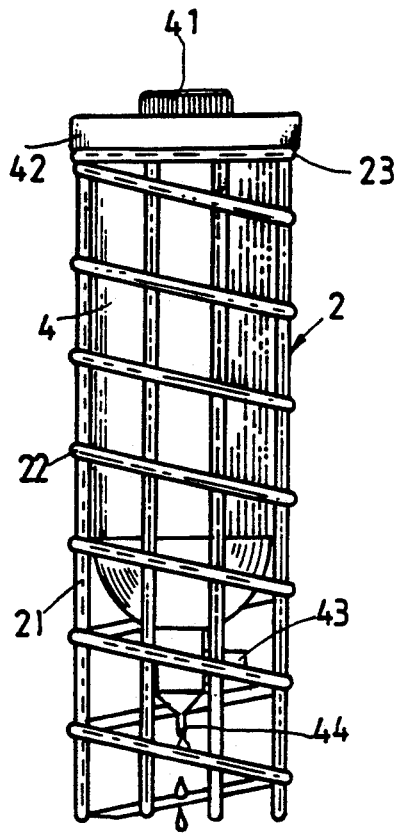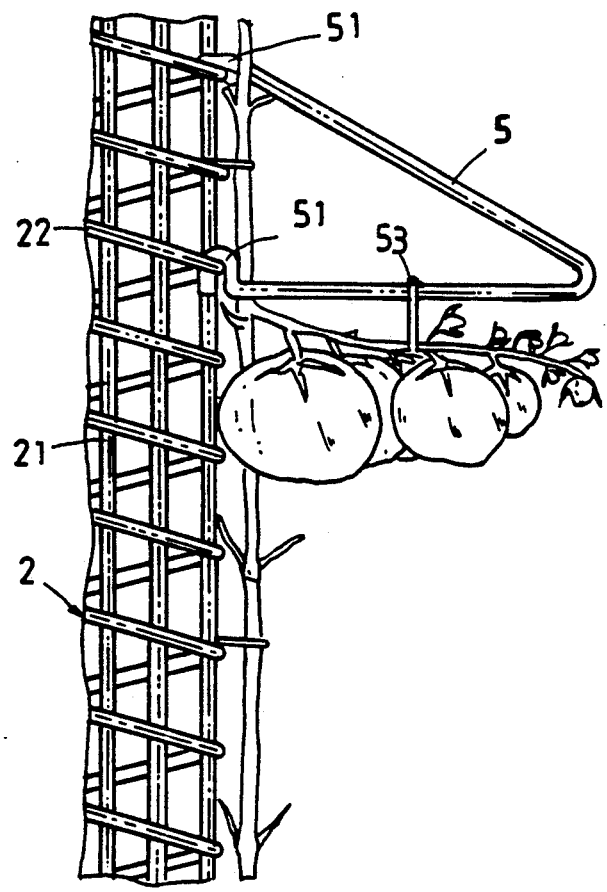
FIG.2  FIG.3-1

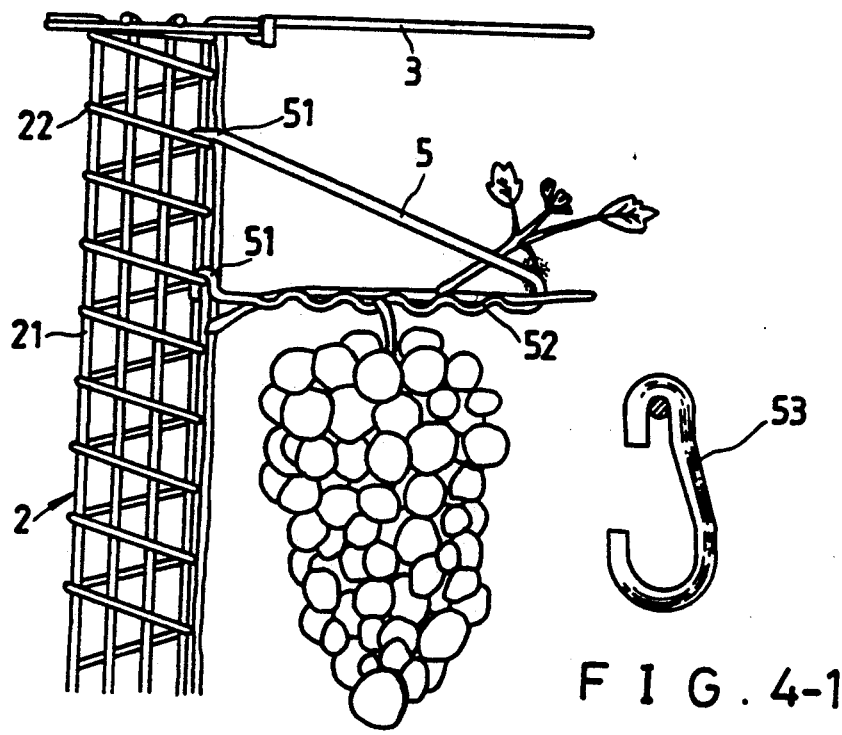
FIG. 4-1
FIG. 4
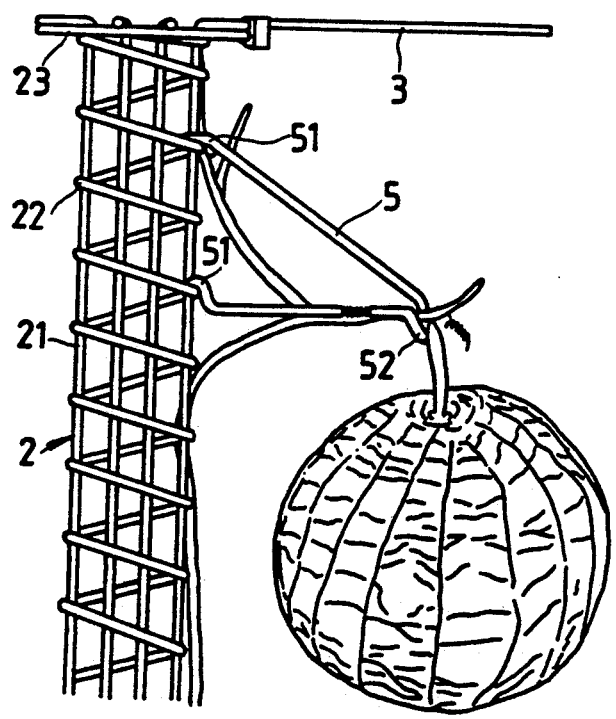
FIG. 3

CREEPING PLANT SUPPORTING FRAME ASSEMBLIES

BACKGROUND OF THE INVENTION

The present invention relates to creeping plant supporting frame assemblies fastened in the ground by anchor rods to support meshed head frames for climbing creeping plants. Fruit baskets and fruit hangers are suspended from the upright support frames thereof for carrying fruits.

In gardening, stakes and sticks are commonly used for supporting creeping plants. However, a stake or stick may be damaged easily under stress of weather. Furthermore, a stake or stick provides less climbing space for climbing creeping plants and has no supporting means for carrying the fruits of the creeping plants being supported.

SUMMARY OF THE INVENTION

The present invention has been accomplished under the aforesaid circumstances. It is therefore an object of the present invention to provide a creeping plant supporting frame assembly which is made from a metal material to provide high structural strength. It is another object of the present invention to provide a creeping plant supporting frame assembly which is treated through corrosion-resisting treatment to ensure elongated service life. It is still another object of the present invention to provide a creeping plant supporting frame assembly which provides good ventilation and is strong against stress of weather. It is still another object of the present invention to provide a creeping plant supporting frame assembly which is standardized for mass production. It is still another object of the present invention to provide a creeping plant supporting frame assembly which is inexpensive to manufacture and easy to install. It is still another object of the present invention to provide a creeping plant supporting frame assembly which provides much space for climbing creeping plants. It is still another object of the present invention to provide a creeping plant supporting frame assembly which has means for carrying fruits. It is still another object of the present invention to provide a creeping plant supporting frame assembly which has feeder bottles for watering and feeding liquid fertilizer automatically.

According to the present invention, a creeping plant supporting frame assembly is generally comprised of a plurality of upright support frames, which are each comprised of a plurality of elongated upright rods spaced from one another around a circle and connected together by a spiral tie bar around the periphery, anchor rods fastened in the ground for supporting the upright support frames in place, a meshed head frame supported over the upright support frames for climbing creeping plants. Feeder bottles are respectively suspended on the upright support frames and controlled by respective regulator knobs for watering and feeding liquid fertilizer automatically. Baskets and hangers are respectively hung on the upright support frames for carrying fruits.

BRIEF DESCRIPTION OF THE DRAWINGS

FIG. 2 illustrates that a feeder bottle is fastened in a support frame for feeding creeping plants;

FIG. 3 illustrates that a fruit hanger is hung on a support frame for carrying fruits;

FIG. 3-1 illustrates an alternate form of the fruit hanger;

FIG. 4 illustrates another alternate form of the fruit hanger;

FIG. 4-1 illustrates a hook to be hung on the fruit hanger for carrying fruits;

DETAILED DESCRIPTION OF THE PREFERRED EMBODIMENTS

Figure 1:
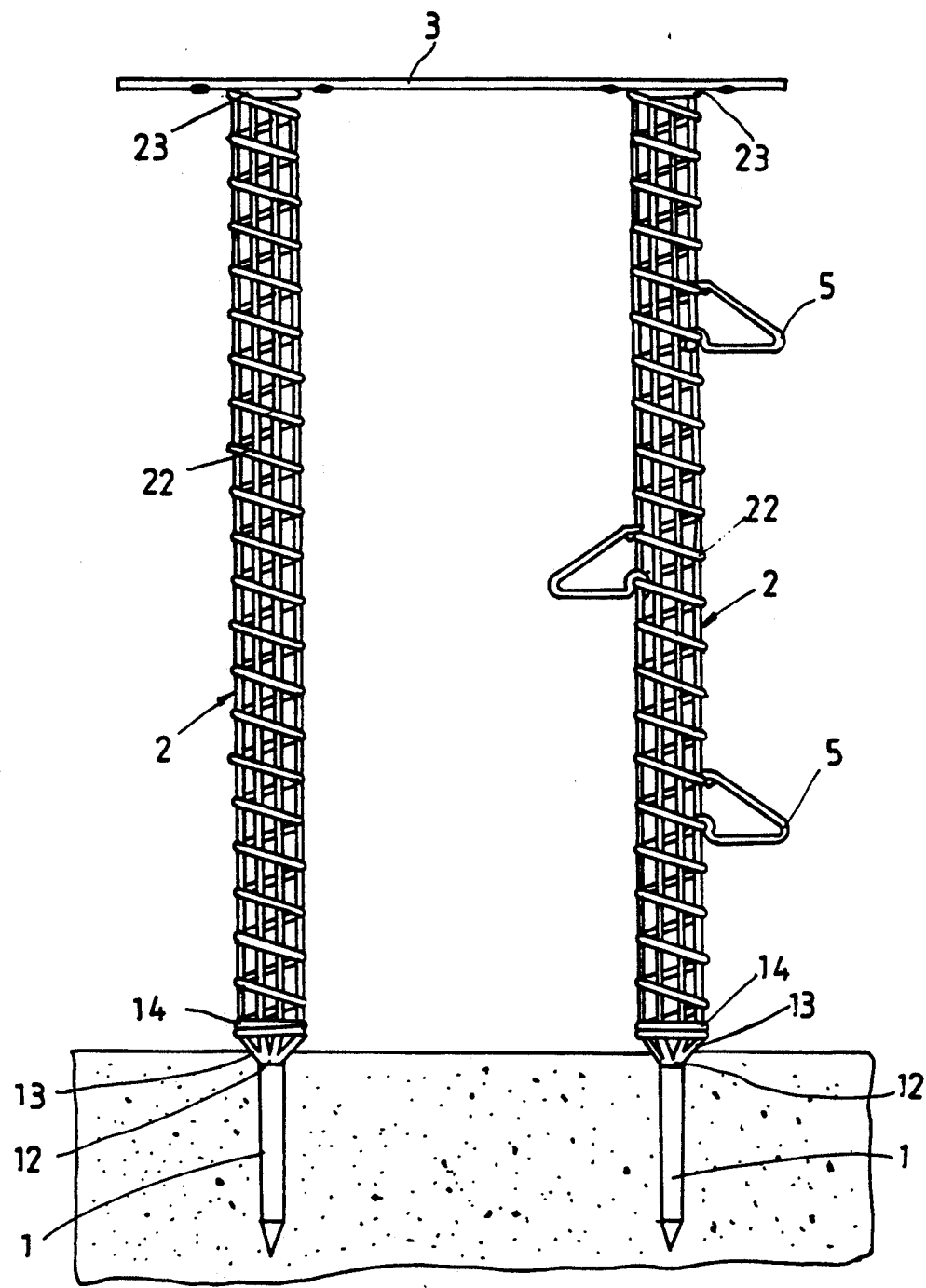
FIG. 1 is a perspective view of a creeping plant supporting frame assembly embodying the present invention, showing that two support frames are fastened in the ground by anchor rods to support a head frame for climbing creeping plants.

Referring to FIG. 1, anchor rod 1 has a bottom end formed into a pointed tip 11 for sticking into the ground, and a top end formed into upward radial ribs 12 connected by a first connecting frame 13 on the top. A second connecting frame 14 is connected to the first connecting frame 13 to hold an elongated support frame 2 on the top. The second connecting frame 14 may be connected to the first connecting frame 13 through a welded or screw joint. The elongated support frame 2 is comprised of a plurality of elongated rods 21 spaced above the periphery of the second connecting frame 14 and tied together by a spiral tie bar 22. A third connecting frame 23 is connected to the elongated rods 21 on the top. A head frame 3 may be connected to the third connecting frame 23 over two adjacent support frames 2 (as shown in FIG. 1). The arrangement of the upward radial ribs 12 on the anchor rod 1 and the elongated rods 21 on the elongated support frame 2 elongated support frame 2, several creeping plants can be respectively tied to the elongated support frame 2 in all directions.

Referring to FIG. 2, the support frame 2 may be made in cylindrical, polygonal, or any of a variety of shape. The number of the elongated rods 21 may be determined according to different purposes. The third connecting frame 23 may be used for supporting a feeder bottle 4 inside the support frame 2. The feeder bottle 4 has an expanded base 42 suspended on the third connecting frame 23, an intake hole 41 for filling water or liquid fertilizer, and a regulating knob 43 for regulating the flow rate through the nozzle 44 thereof.

Referring to FIGS. 3, 3-1, 4 and 4-1 and seeing FIG. 1 again, fruit hangers 5 may be fastened to the support frame 2 for suspending fruits of the cultivated creeping plants. The fruit hanger 5 may be variously embodied. In FIG. 3, the fruit hanger 5 has two ends terminated into two hooks 51,51' respectively hung on the tie bar 22, and a bend 52 curved downwards on the middle for suspending a fruit. In FIG. 4, the fruit hanger 5 has a corrugated leg 52' for suspending fruits by hooks 53 (See FIG. 4-1).

Figure 5:
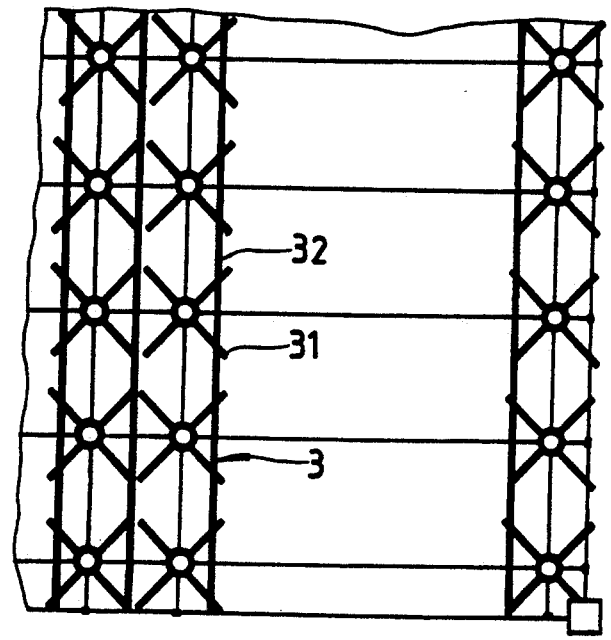
FIG. 5 is a pictorial drawing showing the structure of the head frame.

Referring to FIG. 5, the head frame 3 is consisted of a plurality of parallel rods 32 connected by a plurality of radial connecting members 31 and supported over two adjacent support frames 2 for supporting creeping plants and suspending their fruits.

Figure 6:
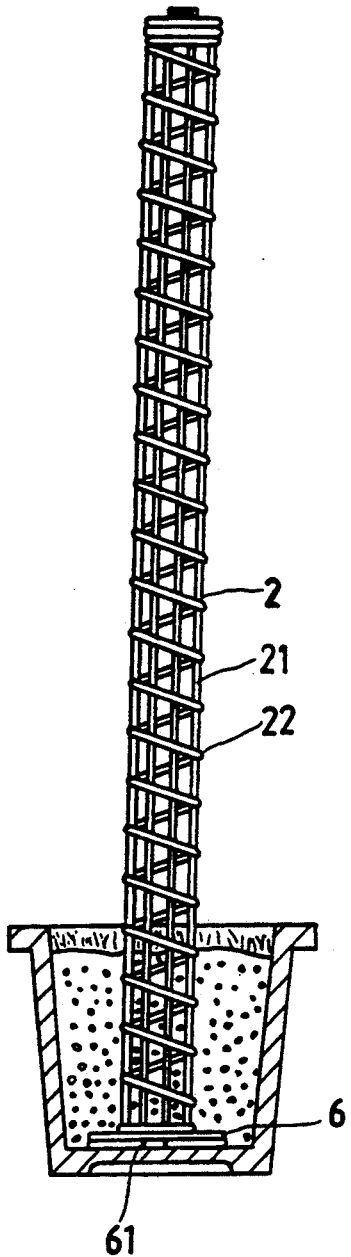
FIG. 6 illustrates an alternate form of the support frame fastened in a pot of soil by an anchor stand.

Referring to FIG. 6, an anchor stand 6 is connected to the elongated rods 21 of the support frame 2 on the bottom through a welding joint or screw joint for anchoring the support frame 2 in a pot. The anchor stand 6 is comprised of a plurality of branch rods 61 extended outwards. By embedding the branch rods 61 in a pot of soil, the support frame 2 is stably fastened in a pot for climbing a creeping plant.

Figure 7:
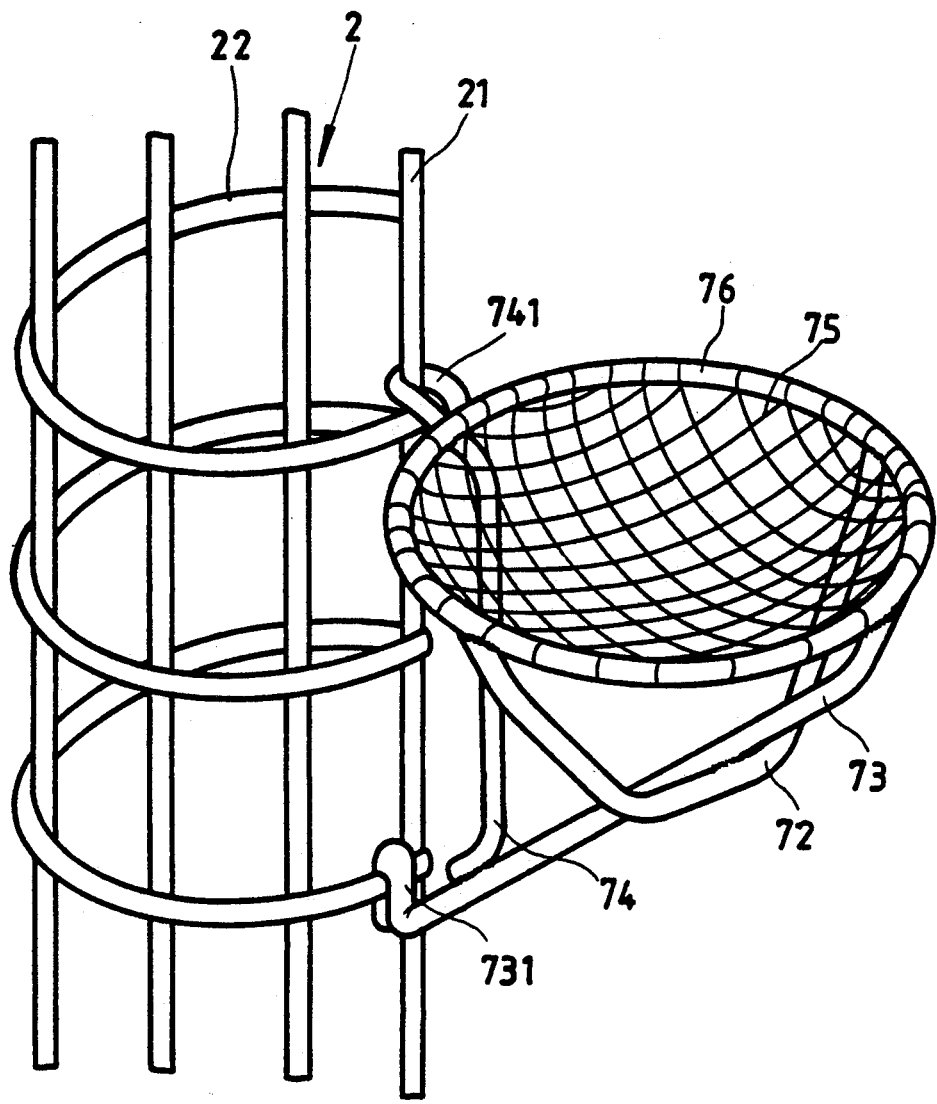
FIG. 7 illustrates a basket hung on the support frame for carrying fruits.

Referring to FIG. 7, the spiral tie bar 22 is connected to the elongated rods 21 through the process of spot welding, and a basket 7 may be suspended from the support frame 2 at a suitable height for holding fruits. The basket 7 comprises a ring 71, a link 72 having two opposite ends welded to the ring 71 at two opposite locations, a front leg 73 having top end welded to the ring 71 and equidistantly spaced from the two opposite ends of the link and a bottom end terminated into a hook 731 hooked on the spiral tie bar 22 of the support frame 2 at a suitable location, a rear leg 74 having a bottom end welded to the front leg 73 and a top end welded to the ring 71 at a location opposite to the top end of the front leg and terminated into a hook 741 hooked on either elongated rod 21 of the support frame 2 at a height above the front leg 73, and a net 75 fastened inside the ring 71 by tie wires 76 for carrying fruits. More front legs 73 and rear legs 74 may be connected to the ring 71 for supporting heavy fruits.

What is claimed is:

1. A creeping plant supporting frame assembly comprising:
   (a) elongated support frame means extending in a vertical direction for mounting said creeping plant thereto, said elongated support frame means including a plurality of vertically directed upright rod members arcuately spaced apart each from the other and a helically contoured tie bar member fixedly secured to said upright rod members at an exterior surface thereof to form an inner vertically directed passageway;
   (b) anchor means secured to said elongated frame means at a bottom section thereof for securing said elongated support frame means into a base surface;
   (c) head frame means secured to a top surface of said elongated support frame means for providing an upper support for said elongated support frame means, said head frame means including a plurality of wires secured to each other forming a mesh screen;
   (d) at least one nutrient feeding bottle member connected to an upper portion of said elongated support frame means and located internally of said inner vertically directed passageway for passage therethrough of nutrients; and,
   (e) at least one plant hanger member releasably coupled to said elongated support frame means and extending externally thereof for support of said plant thereon.

2. A creeping plant supporting frame assembly according to claim 1 wherein said anchor means comprises an anchor rod having a lower end portion formed into a pointed tip for insertion into the base surface, and an upper portion formed into upward radially extending ribs connected to a connecting frame welded to a bottom section of the respective elongated support frame means.

3. A creeping plant supporting frame assembly according to claim 1 wherein said anchor means comprises a plurality of branch rods respectively extended outwards in different directions and embedded in a respective pot of soil.

4. A creeping plant supporting frame assembly according to claim 1 wherein said nutrient feeder bottle member includes an expanded base suspended from a connecting frame of said elongated support frame means, an intake hole for filling water or liquid fertilizer, and a regulating knob for regulating the flow rate through a nozzle thereof.

5. A creeping plant supporting frame assembly according to claim 1 wherein said hanger member includes two legs connected by an arcuately contoured bend for suspending fruits, said two legs each terminating in a hook end section hung on the elongated support frame means.

6. A creeping plant supporting frame assembly according to claim 5 wherein one of the two legs of each fruit hanger comprises a corrugated bottom leg having undulations for coupling thereto a hook member for supporting a portion of said plant.

7. A creeping plant supporting frame assembly according to claim 1 which further comprises a plurality of baskets respectively hung on said elongated support frame means for supporting fruit of said creeping plants.

* * * * *